United States Patent
Zuo et al.

(10) Patent No.: US 12,291,230 B2
(45) Date of Patent: May 6, 2025

(54) METHOD AND DEVICE FOR CONTROLLING VEHICLE AND VEHICLE

(71) Applicants: JIANGSU XCMG CONSTRUCTION MACHINERY RESEARCH INSTITUTE LTD., Xuzhou (CN); XCMG AGRICULTURAL EQUIPMENT TECHNOLOGY CO., LTD., Xuzhou (CN)

(72) Inventors: Shuai Zuo, Xuzhou (CN); Liang Gao, Xuzhou (CN); Ming Chen, Xuzhou (CN); Chenghao Liu, Xuzhou (CN)

(73) Assignees: JIANGSU XCMG CONSTRUCTION MACHINERY RESEARCH INSTITUTE LTD., Xuzhou (CN); XCMG AGRICULTURAL EQUIPMENT TECHNOLOGY CO., LTD., Xuzhou (CN)

( * ) Notice: Subject to any disclaimer, the term of this patent is extended or adjusted under 35 U.S.C. 154(b) by 0 days.

(21) Appl. No.: 18/023,247

(22) PCT Filed: Aug. 8, 2022

(86) PCT No.: PCT/CN2022/110758
§ 371 (c)(1),
(2) Date: Feb. 24, 2023

(87) PCT Pub. No.: WO2024/016395
PCT Pub. Date: Jan. 25, 2024

(65) Prior Publication Data
US 2024/0270277 A1 Aug. 15, 2024

(30) Foreign Application Priority Data

Jul. 20, 2022 (CN) .......................... 202210855251.2

(51) Int. Cl.
*B60W 60/00* (2020.01)
*B60W 40/10* (2012.01)
*B62D 6/00* (2006.01)

(52) U.S. Cl.
CPC .......... *B60W 60/001* (2020.02); *B60W 40/10* (2013.01); *B62D 6/002* (2013.01); *B60W 2300/15* (2013.01); *B60W 2520/06* (2013.01)

(58) Field of Classification Search
CPC ............... B60W 60/001; B60W 40/10; B60W 2300/15; B60W 2520/06; B60W 2300/152; B60W 2520/10; B62D 6/002
See application file for complete search history.

(56) References Cited

U.S. PATENT DOCUMENTS

2009/0138151 A1   5/2009   Smid
2019/0141878 A1   5/2019   Foster
(Continued)

FOREIGN PATENT DOCUMENTS

CN   107264621 A   10/2017
CN   109823393 A    5/2019
(Continued)

OTHER PUBLICATIONS

Z. Yao, G. Liu, D. Zhang, Y. Shen and Z. Wang, "Path Tracking Control for Four-Wheel-Independent-Driven Agricultural High Clearance Sprayer with New Front-Rear-Dual-Steering-Axle," 2020 Chinese Automation Congress (CAC), Shanghai, China, 2020, pp. 2966-2972, doi: 10.1109/CAC51589.2020.9326787. (Year: 2020).*
(Continued)

*Primary Examiner* — Russell Frejd
*Assistant Examiner* — Brittany Renee Peko
(74) *Attorney, Agent, or Firm* — Tucker Ellis LLP

(57) ABSTRACT

Provided are a method and device for controlling a vehicle and a vehicle, and relates to the technical field of automatic
(Continued)

driving. The method for controlling a vehicle includes: obtaining current state information of the vehicle, wherein the state information includes a position information and an attitude information; determining a preview tracking point from a plurality of path points of a target path to be tracked by the vehicle based on a reference information, wherein the reference information includes a preview time; determining a first turning angle and a second turning angle of a front wheel of the vehicle based on the position information and the attitude information, wherein the first turning angle is used for eliminating a distance error between the vehicle and the preview tracking point, and the second turning angle is used for eliminating a heading error between the vehicle and the preview tracking point; and performing a weighting calculation on the first turning angle and the second turning angle to determine a target turning angle for controlling the front wheel, wherein a minimum distance among a plurality of distances between the vehicle and the plurality of path points is a first distance, and at least one parameter of the preview time or a weight corresponding to the first turning angle is positively correlated with the first distance in a case where the first distance is within a preset distance range.

19 Claims, 4 Drawing Sheets

(56) References Cited

U.S. PATENT DOCUMENTS

| | | | | |
|---|---|---|---|---|
| 2020/0001862 | A1* | 1/2020 | Luo | B60W 30/06 |
| 2020/0001920 | A1 | 1/2020 | Hejase et al. | |
| 2021/0086832 | A1 | 3/2021 | Moshchuk | |
| 2021/0149403 | A1* | 5/2021 | Ready-Campbell | G05D 1/0212 |
| 2022/0212693 | A1* | 7/2022 | Fang | B60W 60/0011 |
| 2024/0166242 | A1* | 5/2024 | Dai | B60W 60/0018 |

FOREIGN PATENT DOCUMENTS

| | | | | | |
|---|---|---|---|---|---|
| CN | 110001637 | A | | 7/2019 | |
| CN | 110316193 | A | | 10/2019 | |
| CN | 110667563 | A | | 1/2020 | |
| CN | 111610780 | A | * | 9/2020 | G05D 1/02 |
| CN | 111703422 | A | | 9/2020 | |
| CN | 111731381 | A | | 10/2020 | |
| CN | 112356844 | A | | 2/2021 | |
| CN | 113176782 | A | * | 7/2021 | G05D 1/02 |
| CN | 113324554 | A | | 8/2021 | |
| CN | 113492907 | A | | 10/2021 | |
| CN | 113776549 | A | * | 12/2021 | G01C 21/34 |
| CN | 113815646 | A | | 12/2021 | |
| CN | 114620074 | A | | 6/2022 | |
| CN | 114735002 | A | | 7/2022 | |
| JP | 2016060223 | A | | 4/2016 | |
| KR | 20150104484 | A | | 9/2015 | |
| KR | 20200084938 | A | | 7/2020 | |
| WO | WO2022160196 | A1 | * | 1/2021 | B60W 30/18 |

OTHER PUBLICATIONS

Machine translation (with labelled paragraph numbers) for foreign application CN110001637 (Year: 2019).*
Machine translation (with labelled paragraph numbers) for foreign patent CN114620074A (Year: 2022).*
International Search Report and Written Opinion from corresponding International Patent Application No. PCT/CN2022/110758, dated Dec. 19, 2022, 20 pages including machine translation.
Chinese Office Action from corresponding Application No. 202210855251.2 mailed on Oct. 21, 2024, 32 pages with translation.
Chinese Grant Notice from corresponding Application No. 202210855251.2 mailed on Jan. 7, 2025, 8 pages with translation.
Kai, Zhao, et al., "Research on Path Tracking Algorithm of Autonomous Vehicles Based on Multi-Point Sequence Preview", Automobile Technology, Issue 11, Jul. 2018, 10 pages with translation.

* cited by examiner

METHOD AND DEVICE FOR CONTROLLING VEHICLE AND VEHICLE

CROSS-REFERENCE TO RELATED APPLICATIONS

The present application is based on and claims priority to China Patent Application No. 202210855251.2 filed on Jul. 20, 2022, the disclosure of which is incorporated by reference herein in its entirety.

TECHNICAL FIELD

The present disclosure relates to the technical field of automatic driving, and in particular, to a method and device for controlling a vehicle and a vehicle.

BACKGROUND

In recent years, owing to various advantages, automatic driving technology for vehicles, and in particular for various off-road vehicles, is developing rapidly. For example, by applying automatic driving technology to an agricultural vehicle, manual labor intensity may be reduced, and operation quality and land utilization may be improved.

SUMMARY

According to one aspect of the embodiments of the present disclosure, a method for controlling a vehicle is provided. The method comprises: obtaining current state information of the vehicle, wherein the state information comprises a position information and an attitude information; determining a preview tracking point from a plurality of path points of a target path to be tracked by the vehicle based on a reference information, wherein the reference information comprises a preview time; determining a first turning angle and a second turning angle of a front wheel of the vehicle based on the position information and the attitude information, wherein the first turning angle is used for eliminating a distance error between the vehicle and the preview tracking point, and the second turning angle is used for eliminating a heading error between the vehicle and the preview tracking point; and performing a weighting calculation on the first turning angle and the second turning angle to determine a target turning angle for controlling the front wheel, wherein a minimum distance among a plurality of distances between the vehicle and the plurality of path points is a first distance, and at least one parameter of the preview time or a weight corresponding to the first turning angle is positively correlated with the first distance in a case where the first distance is within a preset distance range.

In some embodiments, a weight corresponding to the second turning angle is negatively correlated with the weight corresponding to the first turning angle.

In some embodiments, a sum of the weight corresponding to the second turning angle and the weight corresponding to the first turning angle is equal to 1.

In some embodiments, each of the at least one parameter changes within a preset parameter range in the case where the first distance is within the preset distance range; each of the at least one parameter is equal to an upper limit of the preset parameter range in a case where the first distance is greater than or equal to an upper limit of the preset distance range; and each of the at least one parameter is equal to a lower limit of the preset parameter range in a case where the first distance is smaller than or equal to a lower limit of the preset distance range.

In some embodiments, the method further comprises: determining a proportional coefficient that changes within a preset coefficient range based on the first distance, wherein each of the at least one parameter is positively correlated with the proportional coefficient; wherein the proportional coefficient is positively correlated with the first distance in the case where the first distance is within the preset distance range; the proportional coefficient is equal to an upper limit of the preset coefficient range in the case where the first distance is greater than or equal to the upper limit of the preset distance range; and the proportional coefficient is equal to a lower limit of the preset coefficient range in the case where the first distance is smaller than or equal to the lower limit of the preset distance range.

In some embodiments, the lower limit of the preset coefficient range is 0, and the upper of the preset coefficient range is 1.

In some embodiments, the proportional coefficient is equal to a ratio of the first distance to the upper limit of the preset distance range in the case where the first distance is within the preset distance range.

In some embodiments, each of the at least one parameter is linearly correlated with the first distance in the case where the first distance is within the preset distance range.

According to other aspect of the embodiments of the present disclosure, a method for controlling a vehicle is provided. The method comprises: obtaining current state information of the vehicle, wherein the state information comprises a position information and an attitude information; determining a preview tracking point from a plurality of path points of a target path to be tracked by the vehicle based on a reference information, wherein the reference information comprises a preview time; and determining a target turning angle for controlling a front wheel of the vehicle based on the position information, the attitude information and the preview tracking point, wherein a minimum distance among a plurality of distances between the vehicle and the plurality of path points is a first distance, and the preview time is positively correlated with the first distance in a case where the first distance is within a preset distance range.

In some embodiments, the method further comprises: determining a trend line reflecting change of each candidate path of a plurality of candidate paths; determining a second distance between the vehicle and the trend line based on the position information; determining a comprised angle between a traveling direction of the vehicle and an extending direction of the trend line based on the attitude information; and selecting one candidate path from the plurality of candidate paths as the target path based on the second distance and the comprised angle.

In some embodiments, selecting one candidate path from the plurality of candidate paths as the target path based on the second distance and the comprised angle comprises: determining a first difference between each candidate path and the vehicle based on the second distance; determining a second difference between each candidate path and the vehicle based on the comprised angle; performing a weighting calculation on the first difference and the second difference to obtain a third difference between each candidate path and the vehicle; and selecting the one candidate path from the plurality of candidate paths as the target path based on the third difference.

In some embodiments, determining a first difference between each candidate path and the vehicle based on the second distance comprises: normalizing the second distance to obtain the first difference.

In some embodiments, the first difference is $$\frac{d_2 - W}{W},$$

where $d_2$ is the second distance, and W is a reference distance.

In some embodiments, the reference distance is equal to half of a distance between trend lines of two candidate paths in a case where the plurality of candidate paths comprises only the two candidate paths having the trend lines parallel to each other.

In some embodiments, a path point closest to the vehicle in each candidate path is a first path point; and the reference distance is a maximum value among a plurality of Euclidean distances between the vehicle and a plurality of first path points of the plurality of candidate paths in a case other than a preset case, wherein the plurality of candidate paths comprises only two candidate paths having trend lines parallel to each other in the preset case.

In some embodiments, determining a second difference between each candidate path and the vehicle based on the comprised angle comprises: normalizing the comprised angle to obtain the second difference.

In some embodiments, the method further comprises: determining another target path only in a case where a preset condition is satisfied after determining the target path, wherein the preset condition comprises completing travel of the target path or receiving a user instruction.

In some embodiments, the reference information further comprises an arranging manner of the plurality of path points, and the arranging manner comprises a first arranging manner or a second arranging manner, wherein: in the first arranging manner, lengths of straight line segments between adjacent path points among the plurality of path points are the same, and in the second arranging manner, lengths of line segments along the target path between adjacent path points among the plurality of path points are the same.

In some embodiments, the method further comprises: controlling the front wheel of the vehicle to rotate at the target turning angle.

In some embodiments, a first line parallel to a tangent line tangent to the target path at the preview tracking point, a second line perpendicular to the tangent line, and an extending line of a traveling direction of the vehicle intersect at a first point, wherein the distance between the first point and the tangent line is a third distance; the first turning angle is equal to arctan (the third distance/a preview distance); and the second turning angle is equal to a comprised angle between an extending direction of the tangent line and the traveling direction of the vehicle.

According to another aspect of the embodiments of the present disclosure, a device for controlling a vehicle is provided. The device comprises: an obtaining module configured to obtain current state information of the vehicle, wherein the state information comprises a position information and an attitude information; a determining module configured to determine a preview tracking point from a plurality of path points of a target path to be tracked by the vehicle based on a reference information, wherein the reference information comprises a preview time; determine a first turning angle and a second turning angle of a front wheel of the vehicle based on the position information and the attitude information, wherein the first turning angle is used for eliminating a distance error between the vehicle and the preview tracking point, and the second turning angle is used for eliminating a heading error between the vehicle and the preview tracking point; and perform a weighting calculation on the first turning angle and the second turning angle to determine a target turning angle for controlling the front wheel, wherein a minimum distance among a plurality of distances between the vehicle and the plurality of path points is a first distance, and at least one parameter of the preview time or a weight corresponding to the first turning angle is positively correlated with the first distance in a case where the first distance is within a preset distance range.

According to a further aspect of the embodiments of the present disclosure, a device for controlling a vehicle is provided. The device comprises: an obtaining module configured to obtain current state information of the vehicle, wherein the state information comprises a position information and an attitude information; and a determining module configured to determine a preview tracking point from a plurality of path points of a target path to be tracked by the vehicle based on a reference information, wherein the reference information comprises a preview time; and determine a target turning angle for controlling a front wheel based on the position information, the attitude information and the preview tracking point, wherein a minimum distance among a plurality of distances between the vehicle and the plurality of path points is a first distance, and the preview time is positively correlated with the first distance in a case where the first distance is within a preset distance range.

According to a further aspect of the embodiments of the present disclosure, provided is a device for controlling a vehicle, which comprises: a memory; and a processor coupled to the memory and configured to perform the method according to any one of the above-described embodiments based on instructions stored in the memory.

According to a further aspect of the embodiments of the present disclosure, provided is a vehicle, which comprises: the device for controlling a vehicle according to any one of the above-described embodiments.

In some embodiments, the vehicle comprises an off-road vehicle.

In some embodiments, the off-road vehicle comprises an agricultural vehicle.

According to a further aspect of the embodiments of the present disclosure, provided is a computer-readable storage medium, which comprises computer program instructions, wherein the method according to any one of the above-described embodiments is implemented when the computer program instructions are executed by a processor.

According to a further aspect of the embodiments of the present disclosure, provided is a computer program product, which comprises a computer program, wherein the method according to any one of the above-described embodiments is implemented when the computer program is executed by a processor.

In the embodiments of the present disclosure, the preview tracking point is determined based on the preview time, and the weighting calculation is performed on the first turning angle and the second turning angle of the front wheel of the vehicle, which are determined based on the position information and the attitude information of the vehicle, to determine the target turning angle for controlling the front wheel of the vehicle. If the first distance reflecting a distance error between the vehicle and the target path is within the preset distance range, at least one parameter of the preview time or the weight corresponding to the first turning angle is dynamically adjusted to change in positive correlation with the change of the distance error between the vehicle and the target path. In this way, the accuracy of path tracking can be improved.

The technical solutions of the present disclosure are further described in detail below by way of the accompanying drawings and embodiments.

BRIEF DESCRIPTION OF THE ACCOMPANYING DRAWINGS

In order to more explicitly explain the embodiments of the present disclosure or the technical solutions in the prior art, the accompanying drawings required to be used in the description of the embodiments or the prior art will be briefly introduced below. It is apparent that the accompanying drawings illustrated below are merely some of the embodiments of the present disclosure. For those of ordinary skill in the art, other accompanying drawings may also be obtained according to these accompanying drawings on the premise that no inventive effort is involved.

DETAILED DESCRIPTION

The technical solutions in the embodiments of the present disclosure will be explicitly and completely described below in conjunction with the accompanying drawings in the embodiments of the present disclosure. Apparently, the embodiments described are merely a part of, rather than all of the embodiments of the present disclosure. On the basis of the embodiments of the present disclosure, all the other embodiments obtained by those of ordinary skill in the art on the premise that no inventive effort is involved shall fall into the protection scope of the present disclosure.

Unless otherwise specified, the relative arrangements, numerical expressions and numerical values of the components and steps expounded in these embodiments shall not limit the scope of the present disclosure.

At the same time, it should be understood that for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description in appropriate situations.

Among all the examples shown and discussed here, any specific value shall be construed as being merely exemplary, rather than as being restrictive. Thus, other examples of the exemplary embodiments may have different values.

It should be noted that: similar numerals and letters present similar items in the following accompanying drawings, and therefore, once an item is defined in one accompanying drawing, it is unnecessary to make further discussion on it in a subsequent accompanying drawing.

At present, during the automatic driving process of a vehicle, the accuracy of path tracking is relatively low. Taking an agricultural vehicle as an example, the low accuracy of path tracking may result in the decline of operation quality of the agricultural vehicle and land utilization.

In view of this, the present disclosure provides the following solutions, which can improve the accuracy of path tracking.

Figure 1:
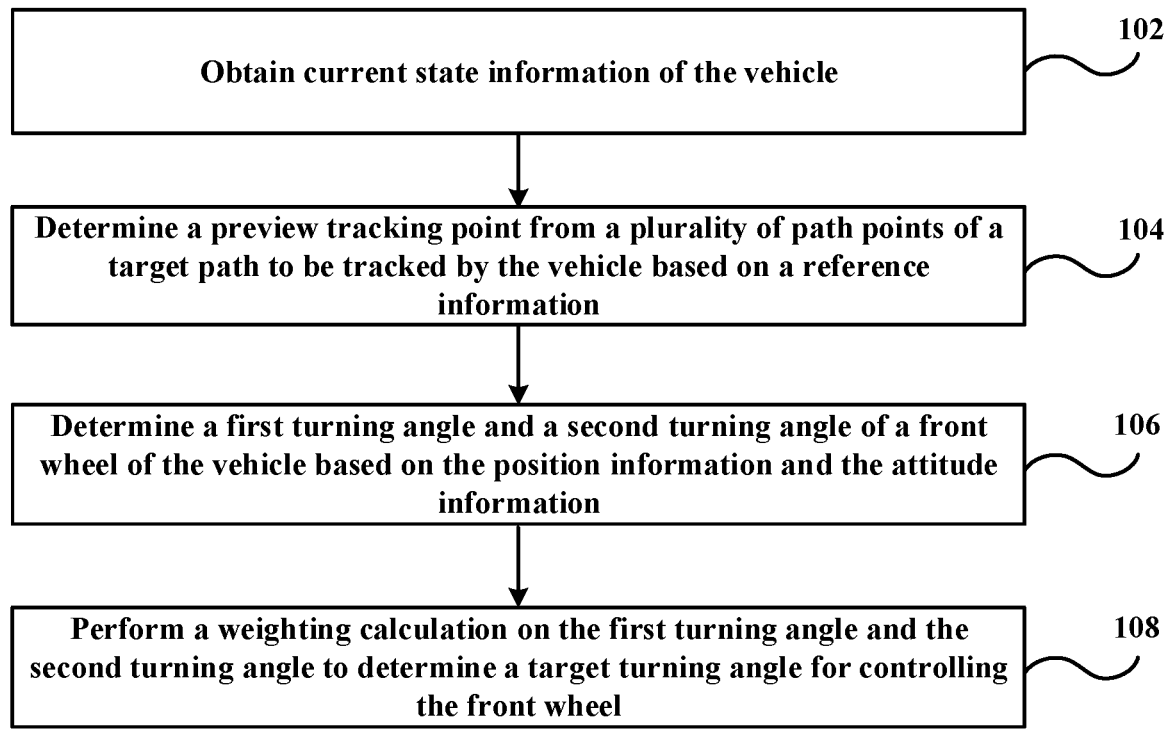
FIG. 1 is a schematic flowchart of a method for controlling a vehicle according to some embodiments of the present disclosure.

FIG. 1 is a schematic flowchart of a method for controlling a vehicle according to some embodiments of the present disclosure.

As shown in FIG. 1, the method for controlling a vehicle comprises steps 102 to 108.

In step 102, current state information of the vehicle is obtained.

Here, the state information comprises a position information and an attitude information. In some embodiments, the state information also comprises a speed information.

The position information can reflect a current position of the vehicle, and the position of the vehicle may be represented as a position of any part of the vehicle. For example, a position of a midpoint of front wheels of the vehicle may be used to represent the position of the vehicle. The attitude information of the vehicle can reflect a current traveling direction of the vehicle.

In some embodiments, the vehicle may be an off-road vehicle, for example, an agricultural vehicle. The agricultural vehicle may comprise, but not limited to, a tractor, a transplanter, and the like.

In step 104, a preview tracking point is determined from a plurality of path points of a target path to be tracked by the vehicle based on a reference information.

Here, the reference information comprises a preview time.

In some embodiments, the reference information further comprises an arranging manner of the plurality of path points of the target path. That is, the preview tracking point is determined based on the arranging manner of the plurality of path points and the preview time. The arranging manner comprises a first arranging manner or a second arranging manner. The first arranging manner and the second arranging manner are introduced respectively below.

In the first arranging manner, the lengths of straight line segments between adjacent path points among the plurality of path points are the same. That is, the plurality of path points is arranged at equal distance interval S.

In this case, the index value n of the preview tracking point may be calculated according to the following formula (1):

$$n = \frac{vt_{pre} + D_0}{S} \tag{1}$$

Here, v is a speed of the vehicle, $t_{pre}$ is the preview time, and $D_0$ is a minimum preview distance. The minimum preview distance may be set according to actual situation.

In the second arranging manner, the lengths of line segments along the target path between adjacent path points among the plurality of path points are the same. That is, in a case where the speed of the vehicle is constant, the plurality of path points is arranged at equal time interval T.

In this case, the index value n of the preview tracking point may be calculated according to the following formula (2):

$$n = \frac{t_{pre}}{T} \qquad (2)$$

In step 106, a first turning angle and a second turning angle of a front wheel of the vehicle is determined based on the position information and the attitude information.

Here, the first turning angle is used for eliminating a distance error between the vehicle and the preview tracking point, and the second turning angle is used for eliminating a heading error between the vehicle and the preview tracking point.

For example, there is a distance error and a heading error between the vehicle and the preview tracking point. The distance error and the heading error between the vehicle and the preview tracking point can be eliminated by adjusting the front wheel (s) of the vehicle to rotate at the first turning angle and the second turning angle, so that the vehicle can travel to the preview tracking point. The first turning angle and the second turning angle are further described later in conjunction with the embodiment of FIG. 2.

In step 108, a weighting calculation on the first turning angle and the second turning angle is performed to determine a target turning angle for controlling the front wheel.

In some embodiments, after the target turning angle for controlling the front wheel is determined, the front wheel of the vehicle may be controlled to rotate at the target turning angle.

In some embodiments, the sum of a weight corresponding to the first turning angle and a weight corresponding to the second turning angle is not equal to 1. In other embodiments, the sum of the weight corresponding to the first turning angle and the weight corresponding to the second turning angle is equal to 1.

The minimum distance among a plurality of distances between the vehicle and the plurality of path points is a first distance. In other words, the first distance is the distance between the vehicle and a closest path point.

Here, in a case where the first distance is within a preset distance range, at least one parameter of the preview time or the weight corresponding to the first turning angle is positively correlated with the first distance.

For example, in the case where the first distance is within the preset distance range, at least one parameter of the preview time or the weight corresponding to the first turning angle may be linearly correlated with the first distance.

It should be understood that the first distance is within the preset distance range, which means that the first distance is greater than or equal to a lower limit of the preset distance range and is smaller than or equal to an upper limit of the preset distance range. For example, the preset distance range may be [0, $d_{ref}$], where $d_{ref}$ may be a preset reference distance.

A greater first distance, i.e., the greater the distance between the vehicle and the closest path point, means a greater distance error between the vehicle and the target path. By contrary, a smaller first distance means a smaller distance error between the vehicle and the target path.

In some embodiments, in the case where the first distance is within the preset distance range, the preview time is positively correlated with the first distance. In these embodiments, for example, the weight corresponding to the first turning angle may be a fixed preset value.

In the case where the first distance is within the preset distance range, the greater the distance error between the vehicle and the target path is, the longer the preview time will be; and the smaller the distance error between the vehicle and the target path is, the shorter the preview time will be. Compared with a fixed preview time, the preview time is dynamically adjusted to change in positive correlation with the change of the distance error between the vehicle and the target path, so that the vehicle can accurately travel to the preview tracking point. In this way, the accuracy of path tracking can be improved.

In other embodiments, in the case where the first distance is within the preset distance range, the weight corresponding to the first turning angle is positively correlated with the first distance. In these embodiments, for example, the preview time may be a fixed preset value.

In the case where the first distance is within the preset distance range, the greater the distance error between the vehicle and the target path is, the greater the weight corresponding to the first turning angle will be; and the smaller the distance error between the vehicle and the target path is, the smaller the weight corresponding to the first turning angle will be. Compared with a fixed weight corresponding to the first turning angle, the weight corresponding to the first turning angle is dynamically adjusted to change in positive correlation with the change of the distance error between the vehicle and the target path, so that the vehicle can accurately travel to the preview tracking point. In this way, the accuracy of path tracking can be improved.

In further embodiments, in the case where the first distance is within the preset distance range, the preview time and the weight corresponding to the first turning angle are both positively correlated with the first distance.

The preview time and the weight corresponding to the first turning angle are dynamically adjusted to change in positive correlation with the change of the distance error between the vehicle and the target path, so that the vehicle can more accurately travel to the preview tracking point. In this way, the accuracy of path tracking can be further improved.

In the above-described embodiments, the preview tracking point is determined based on the preview time, and the weighting calculation is performed on the first turning angle and the second turning angle of the front wheel of the vehicle, which are determined based on the position information and the attitude information of the vehicle, to determine the target turning angle for controlling the front wheel of the vehicle. If the first distance reflecting the distance error between the vehicle and the target path is within the preset distance range, at least one parameter of the preview time or the weight corresponding to the first turning angle is dynamically adjusted to change in positive correlation with the change of the distance error between the vehicle and the target path. In this way, the accuracy of path tracking can be improved.

Taking the vehicle which is an agricultural vehicle as an example, the operation accuracy of the agricultural vehicle is improved as the accuracy of path tracking is improved, which means that the operation quality of the agricultural vehicle and the land utilization are also improved accordingly.

Figure 2:
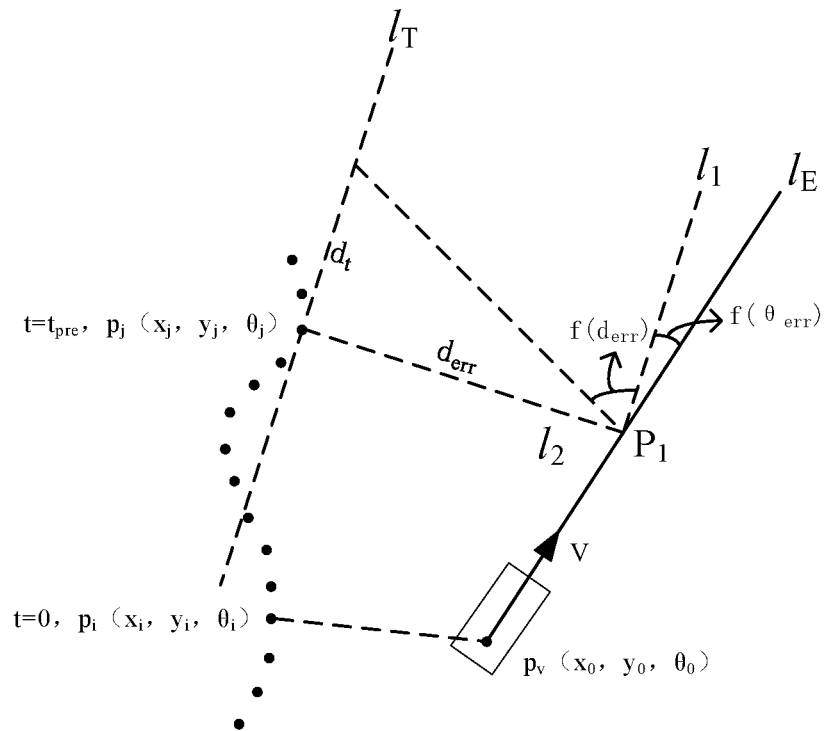
FIG. 2 is a schematic diagram of a vehicle and a plurality of path points of a target path according to some embodiments of the present disclosure.

The first turning angle and the second turning angle are described below in conjunction with the embodiment shown in FIG. 2. FIG. 2 is a schematic diagram of a vehicle and a plurality of path points of a target path according to some embodiments of the present disclosure.

As shown in FIG. 2, in the same reference coordinate system, the point $p_v$ ($x_0$, $y_0$, $\theta_0$) represents the vehicle, the point pi ($x_i$, $y_i$, $\theta_i$) represents the path point currently closest to the vehicle among the plurality of path points of the target path (hereinafter referred to as the closest path point), and the point $p_j$ ($x_j$, $y_j$, $\theta_j$) represents the preview tracking point to which the vehicle is expected to travel after the elapse of the preview time $t_{pre}$.

Specifically, in the point $p_v$ ($x_0$, $y_0$, $\theta_0$), $x_0$ and $y_0$ represent the position of the vehicle, $\theta_0$ represents the traveling direction of the vehicle, and v represents the speed of the vehicle. In the point $p_i$ ($x_i$, $y_i$, $\theta_i$), $x_i$ and $y_i$ represent the position of the closest path point, $\theta_i$ represents the extending direction of a tangent line tangent to the target path at the closest path point, and i represents the index value of the closest path point. Similarly, in the point $p_j$ ($x_j$, $y_j$, $\theta_j$), $x_j$ and $y_j$ represent the position of the preview tracking point, $\theta_j$ represents the extending direction of a tangent line tangent to the target path at the preview tracking point, and j represents the index value of the preview tracking point.

Referring to FIG. 2, a first line $l_1$ parallel to a tangent line $l_T$ tangent to the target path at the preview tracking point $p_j$, a second line $l_2$ perpendicular to the tangent line $l_T$, and an extending line $l_E$ of the traveling direction of the vehicle intersect at a first point $p_1$. The distance between the first point $P_1$ and the tangent line $l_T$ is a third distance.

In these embodiments, the first turning angle $f(d_{err})$ =arctan ($d_{err}/d_t$), where $d_{err}$ is the third distance, and $d_t$ is a preview distance. The second turning angle $f(\theta_{err})$ is equal to a comprised angle between the extending direction of the tangent line $l_T$ tangent to the target path at the preview tracking point and the traveling direction of the vehicle.

The preview distance may be related to the speed of the vehicle. For example, the preview distance may be positively correlated with the speed of the vehicle. For another example, the preview distance may be linearly correlated with the speed of the vehicle. As some implementations, the preview distance is equal to the speed of the vehicle/a preset gain factor.

That is, in these embodiments, the first turning angle and the second turning angle of the vehicle are determined based on the position information, the attitude information and the speed information of the vehicle.

The method for controlling a vehicle shown in FIG. 1 is further described below in conjunction with some embodiments.

As described above, in some embodiments, in the case where the first distance is within the preset distance range, the weight corresponding to the first turning angle is positively correlated with the first distance. In these embodiments, the weight corresponding to the second turning angle is negatively correlated with the weight corresponding to the first turning angle. That is, the greater the weight corresponding to the first turning angle is, the smaller the weight corresponding to the second turning angle will be.

As some implementations, the sum of the weight corresponding to the second turning angle and the weight corresponding to the first turning angle is equal to 1. That is, in these implementations, the weighting calculation on the first turning angle and the second turning angle may be performed according to the following formula (3) to obtain the target turning angle δt:

$$\delta_t = \omega_\delta \times f(d_{err}) + (1 - \omega_\delta) \times f(\theta_{err}) \qquad (3)$$

Here, $f(d_{err})$ is the first turning angle, $f(\theta_{err})$ is the second turning angle, and $\omega_\delta$ is the weight corresponding to the first turning angle.

In the above-described embodiments, when there is a relatively large distance error between the vehicle and the target path, the weight corresponding to the first turning angle is increased and the weight corresponding to the second turning angle is reduced, which is conducive to rapidly eliminating the distance error between the vehicle and the preview tracking point and improving the efficiency of path tracking. By contrary, when there is a relatively small distance error between the vehicle and the target path, the weight corresponding to the first turning angle is reduced and the weight corresponding to the second turning angle is increased, which is conducive to rapidly eliminating the heading error between the vehicle and the preview tracking point and improving the ride comfort of path tracking. In this way, a balance between the efficiency and ride comfort of path tracking can be achieved whilst improving the accuracy of path tracking.

In some embodiments, in the case where the first distance is within the preset distance range, each of the at least one parameter of the preview time or the weight corresponding to the first turning angle changes within a preset parameter range.

In these embodiments, in a case where the first distance is greater than or equal to an upper limit of the preset distance range, each of the at least one parameter is equal to an upper limit of the preset parameter range; and in a case where the first distance is smaller than or equal to a lower limit of the preset distance range, each of the at least one parameter is equal to a lower limit of the preset parameter range.

It should be understood that the preview time and the weight corresponding to the first turning angle may have different preset parameter ranges.

For example, the preset parameter range of the preview time may be [$t_{min}$, $t_{max}$], where $t_{min}$ is a preset minimum preview time, and $t_{max}$ is a preset maximum preview time; and the preset parameter range of the weight corresponding to the first turning angle may be [$\omega_{min}$, $\omega_{max}$], where $\omega_{min}$ is a preset minimum weight corresponding to the first turning angle, and $\omega_{max}$ is a preset maximum weight corresponding to the first turning angle.

As some implementations, a proportional coefficient that changes within a preset coefficient range may also be determined based on the first distance. For example, the preset coefficient range is [0, 1], that is, a lower limit of the preset coefficient range is 0 and an upper limit of the preset coefficient range is 1.

Specifically, in the case where the first distance is within the preset distance range, the proportional coefficient is positively correlated with the first distance; in the case where the first distance is greater than or equal to the upper limit of the preset distance range, the proportional coefficient is equal to an upper limit of the preset coefficient range; and in the case where the first distance is smaller than or equal to the lower limit of the preset distance range, the proportional coefficient is equal to a lower limit of the preset coefficient range.

For example, in the case where the first distance is within the preset distance range, the proportional coefficient may be equal to a ratio of the first distance to the upper limit of the preset distance range. That is, the proportional coefficient k may be calculated according to the following formula (4):

$$k = \max\left(0, \min\left(\frac{|d_1|}{d_{ref}}, 1\right)\right) \quad (4)$$

Here, $d_1$ is the first distance, and $d_{ref}$ is the upper limit of the preset distance range.

In these implementations, each of the at least one parameter is positively correlated with the proportional coefficient.

For example, the preview time $t_{pre}$ may be calculated according to the following formula (5):

$$t_{pre} = \max(t_{min}, \min(t_{min} + k(t_{max} - t_{min}), t_{max})) \quad (5)$$

For example, the weight $\omega_\delta$ corresponding to the first turning angle may be calculated according to the following formula (6):

$$\omega_\delta = \max(\omega_{min}, \min(\omega_{min} + k(\omega_{max} - \omega_{min}), \omega_{max})) \quad (6)$$

In the above-described implementations, the proportional coefficient is obtained by normalizing the first distance, and then the preview time and the weight corresponding to the first turning angle may be determined based on the same proportional coefficient respectively. In this way, whilst improving the accuracy of path tracking, calculation can be simplified and processing pressure can be reduced, and thus the efficiency of determining the target turning angle can be improved.

In some embodiments, after the target path is determined, another target path is determined only in a case where a preset condition is satisfied. Here, the preset condition comprises completing the travel of the target path or receiving a user instruction. For example, the user instruction may instruct the vehicle to stop automatic driving and to be taken over manually, or instruct to switch a target path. In this way, the vehicle can be prevented from frequent switches between different paths during automatic driving process, thereby improving the safety of driving and improving the efficiency of the vehicle in completing the travel of the target path.

Figure 3:
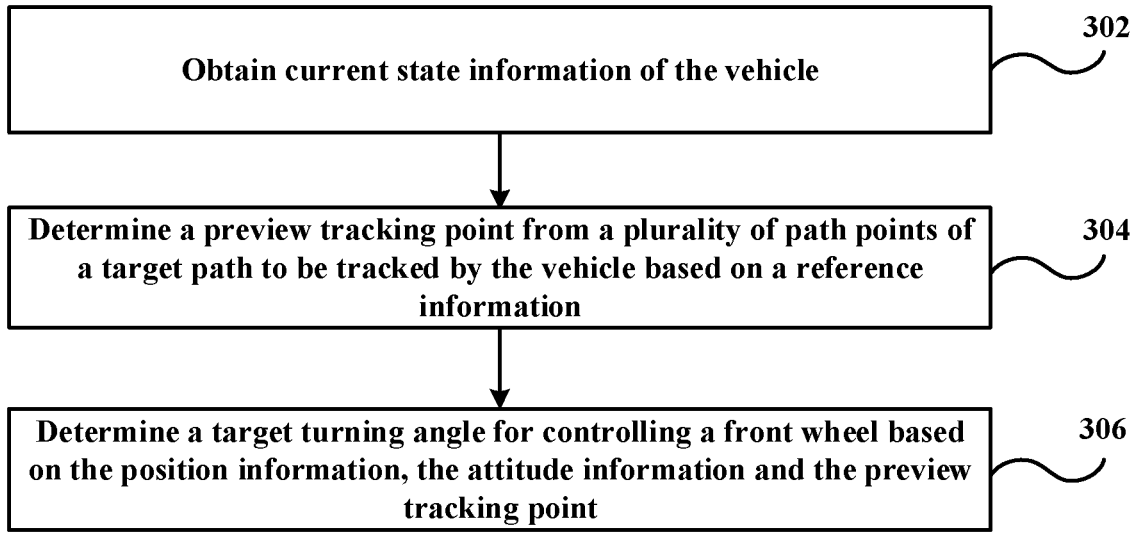
FIG. 3 is a schematic flowchart of a method for controlling a vehicle according to other embodiments of the present disclosure.

FIG. 3 is a schematic flowchart of a method for controlling a vehicle according to other embodiments of the present disclosure.

As shown in FIG. 3, the method for controlling a vehicle may comprise steps 302 to 306.

In step 302, current state information of the vehicle is obtained.

Here, the state information comprises a position information and an attitude information. In some embodiments, the state information also comprises a speed information.

In step 304, a preview tracking point is determined from a plurality of path points of a target path to be tracked by the vehicle based on a reference information.

Here, the reference information comprises a preview time. In some embodiments, the reference information further comprises an arranging manner of the plurality of path points of the target path.

In step 306, a target turning angle for controlling a front wheel is determined based on the position information, the attitude information, and the preview tracking point.

For example, a first turning angle for eliminating a distance error between the vehicle and the preview tracking point and a second turning angle for eliminating a heading error between the vehicle and the preview tracking point can be determined based on the position information, the attitude information and the preview tracking point, and a weighting calculation is performed on the first turning angle and the second turning angle to obtain the target turning angle for controlling the front wheel of the vehicle.

In some embodiments, the sum of a weight corresponding to the first turning angle and a weight corresponding to the second turning angle is not equal to 1.

In other embodiments, the sum of the weight corresponding to the first turning angle and the weight corresponding to the second turning angle is equal to 1. For example, the weight corresponding to the first turning angle and the weight corresponding to the second turning angle are equal to each other, that is, equal to 0.5 respectively. For another example, the weight corresponding to the first turning angle is not equal to the weight corresponding to the second turning angle.

Here, a minimum distance among a plurality of distances between the vehicle and the plurality of path points is a first distance. In a case where the first distance is within a preset distance range, the preview time is positively correlated with the first distance.

In the above-described embodiments, the preview tracking point is determined based on the preview time, and the target turning angle for controlling the front wheel of the vehicle is determined based on the position information and the attitude information of the vehicle and the preview tracking point. If the first distance reflecting the distance error between the vehicle and the target path is within the preset distance range, the preview time is dynamically adjusted to change in positive correlation with the change of the first distance. In this way, the accuracy of path tracking can be improved.

For other various embodiments of the method for controlling a vehicle shown in FIG. 3, reference may be made to the relevant embodiments of the method for controlling a vehicle shown in FIG. 1, which will not be described in detail here.

In the methods for controlling a vehicle shown in FIGS. 1 and 3, the target path may be a certain path designated by a user, or a path automatically determined based on the method according to the following embodiments.

Figure 4:
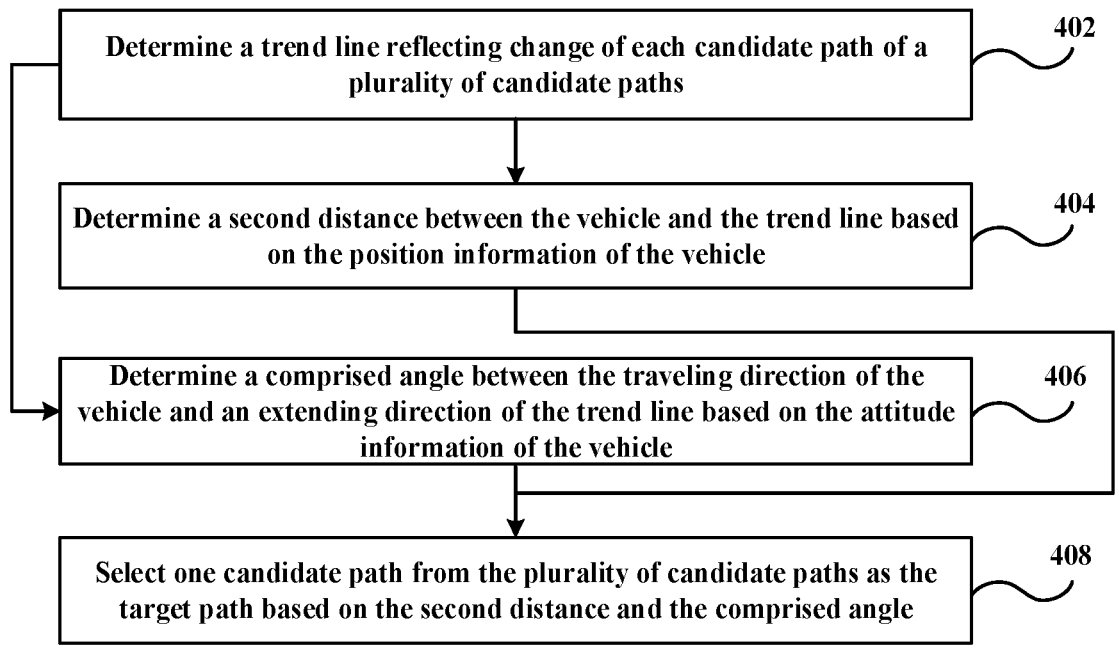
FIG. 4 is a schematic flowchart of determining a target path according to some embodiments of the present disclosure.

FIG. 4 is a schematic flowchart of determining a target path according to some embodiments of the present disclosure.

As shown in FIG. 4, the method for controlling a vehicle may comprise steps 402 to 408.

In step 402, a trend line reflecting change of each candidate path of a plurality of candidate paths is determined.

For example, the plurality of candidate paths may be input by a user, and each candidate path may comprise a plurality of discrete path points. The trend line of a candidate path can reflect a change trend of the candidate path as a whole.

As some implementations, linear fitting on a plurality of path points of a candidate path can be performed to obtain the trend line of this candidate path.

As other implementations, a connecting line between a starting path point and an ending path point of a candidate path may be as the trend line of this candidate path.

In these implementations, the angle $\theta_L$ representing the extending direction of a trend line may be first calculated based on the formula (7):

$$\theta_L = \arctan\left(\frac{y_m - y_1}{x_m - x_1}\right) \quad (7)$$

Here, $x_m$ and $y_m$ represent the position of the starting path point of a candidate path, and $x_1$ and $y_1$ represent the position of the ending path point of the candidate path.

After the angle $\theta_L$ representing the extending direction of the trend line is calculated, the trend line may be expressed as the following formula (8):

$$\begin{cases} y = \tan\theta_L x + b, \theta_L \neq \pm\frac{\pi}{2} \\ x = x_1, \theta_L = \pm\frac{\pi}{2} \end{cases} \quad (8)$$

Here, b is the intercept of the trend line. The intercept can be obtained by substituting the position of the starting path point or the ending path point into the formula (8).

In step 404, a second distance between the vehicle and the trend line is determined based on current position information of the vehicle.

For example, the second distance $d_2$ between the vehicle and the trend line may be calculated based on the formula (9) for calculating a distance between a point and a straight line:

$$\begin{cases} d_2 = \frac{|\tan\theta_L x_0 - y_0 + b|}{\sqrt{(\tan\theta_L)^2 + (-1)^2}}, \theta_L \neq \pm\frac{\pi}{2} \\ d_2 = |x - x_1|, \theta_L = \pm\frac{\pi}{2} \end{cases} \quad (9)$$

Here, $x_0$ and $y_0$ represent the position of the vehicle.

In step 406, a comprised angle between the traveling direction of the vehicle and an extending direction of the trend line is determined based on current attitude information of the vehicle.

The comprised angle between the traveling direction of the vehicle and the extending direction of the trend line is equal to $\theta_L - \theta$.

In step 408, one candidate path is selected from the plurality of candidate paths as the target path based on the second distance and the comprised angle.

It should be understood that the second distance and the comprised angle between the traveling direction of the vehicle and the extending direction of the trend line can reflect a difference between the candidate path and the position and attitude of the vehicle. For example, a smaller second distance and a smaller comprised angle between the traveling direction of the vehicle and the extending direction of the trend line indicate a smaller difference between the candidate path and the position and attitude of the vehicle.

One candidate path with the smallest difference from the position and attitude of the vehicle is selected from the plurality of candidate paths as the target path.

In the above-described embodiments, one candidate path is selected from the plurality of candidate paths as the target path based on the second distance reflecting the distance error between the vehicle and the candidate path and the comprised angle reflecting the heading error between the vehicle and the candidate path. In this way, one candidate path with the smallest difference from the position and attitude of the vehicle may be selected from the plurality of candidate paths as the target path, so as to improve the efficiency of the vehicle in completing the travel of the target path.

It should be understood that if there is still a plurality of candidate paths remaining after the vehicle completes the travel of the target path, another target path can continue to be determined according to the method shown in FIG. 4.

As some implementations, in step 408, a first difference between each candidate path and the vehicle may be determined based on the second distance, and a second difference between each candidate path and the vehicle may be determined based on the comprised angle between the traveling direction of the vehicle and the extending direction of the trend line. Then, a weighting calculation may be performed on the first difference and the second difference to obtain a third difference between each candidate path and the vehicle.

It should be understood that the first difference is positively correlated with the second distance, and the second difference is positively correlated with the comprised angle.

In these implementations, one candidate path can be selected from the plurality of candidate paths as the target path based on the third difference between each candidate path and the vehicle.

In the above-described implementations, the first difference and the second difference between a candidate path and the vehicle are determined based on the second distance and the comprised angle respectively, and then one candidate path is selected from the plurality of candidate paths as the target path based on the third difference obtained by performing a weighting calculation on the first difference and the second difference. In this way, one candidate path with the smallest difference from the position and attitude of the vehicle can be more accurately selected from the plurality of candidate paths as the target path, thereby further improving the efficiency of the vehicle in completing the travel of the target path.

In some embodiments, the first difference may be the value of the second distance, and the second difference may be the value of the comprised angle. For example, if the second distance is equal to 80 meters, the first difference is equal to 80. For another example, if the comprised angle between the traveling direction of the vehicle and the extending direction of a trend line is 50 degrees, the second difference is equal to 50.

In some embodiments, the second distance may be normalized to obtain the first difference. In other embodiments, the comprised angle between the traveling direction of the vehicle and the extending direction of the trend line may be normalized to obtain the second difference.

In these embodiments, the second distance and the comprised angle are normalized respectively to obtain the first difference and the second difference between a candidate path and the vehicle, and then one candidate path is selected from the plurality of candidate paths as the target path based on the third difference obtained by performing a weighting calculation on the first difference and the second difference. In this way, one candidate path with the smallest difference from the position and attitude of the vehicle can be more accurately selected from the plurality of candidate paths as the target path, thereby further improving the efficiency of the vehicle in completing the travel of the target path.

As some implementations, the first difference between a candidate path and the vehicle is $$\frac{d_2 - W}{W},$$

where d2 is the second distance and W is a reference distance. As other implementations, the second difference between a candidate path and the vehicle is $$\frac{\theta_L - \theta}{\pi/2}.$$

In these implementations, for example, the weighting calculation may be performed on the first difference and the second difference based on the following formula (10) to obtain the third difference C:

$$C = \omega_c \frac{\theta_L - \theta}{\pi/2} + (1 - \omega_c)\frac{d_2 - W}{W} \qquad (10)$$

Here, $\omega_c$ is a weight corresponding to the second difference.

The inventors have noticed that, by using different reference distances to normalize the second distance under different conditions, it is helpful to accurately select one candidate path with the smallest difference from the position and attitude of the vehicle from the plurality of candidate paths as the target path.

In some embodiments, the plurality of candidate paths comprises only two candidate paths having trend lines parallel to each other.

Figure 5:
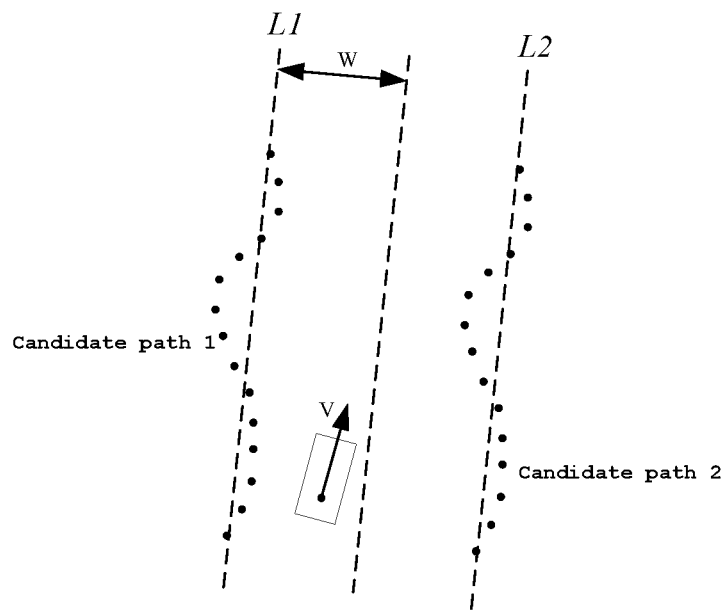
FIG. 5 is a schematic diagram of a vehicle and a plurality of candidate paths according to some embodiments of the present disclosure.

Referring to FIG. 5, the plurality of candidate paths comprises two candidate paths (candidate path 1 and candidate path 2) having trend lines (L1 and L2) parallel to each other.

In this case, the reference distance is equal to half of the distance between the trend lines of the two candidate paths.

In other embodiments, the path point closest to the vehicle in each candidate path is a first path point (i.e., the closest path point). In a case other than a preset case, the reference distance is the maximum value among a plurality of Euclidean distances between the vehicle and a plurality of first path points of the plurality of candidate paths.

Here, the plurality of candidate paths comprises only two candidate paths having trend lines parallel to each other in the preset case. In other words, the case other than the preset case may comprise, for example, a case where the plurality of candidate paths comprises only two candidate paths having trend lines not parallel to each other, a case where the plurality of candidate paths comprises more than two candidate paths, and the like.

In this way, the second distance can be normalized to obtain the first difference based on an appropriate reference distance, so that one candidate path with the smallest difference from the position and attitude of the vehicle is accurately selected from the plurality of candidate paths as the target path based on the first difference subsequently, thereby helping to improve the efficiency of the vehicle in completing the travel of the target path.

Figure 6:
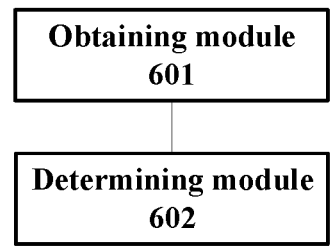
FIG. 6 is a schematic structural diagram of a device for controlling a vehicle according to some embodiments of the present disclosure.

FIG. 6 is a schematic structural diagram of a device for controlling a vehicle according to some embodiments of the present disclosure.

As shown in FIG. 6, the device 600 for controlling a vehicle comprises an obtaining module 601 and a determining module 602.

The obtaining module 601 is configured to obtain current state information of the vehicle. The state information comprises a position information and an attitude information.

The determining module 602 is configured to determine a preview tracking point from a plurality of path points of a target path to be tracked by the vehicle based on a reference information; determine a first turning angle and a second turning angle of a front wheel of the vehicle based on the position information and the attitude information; and perform a weighting calculation on the first turning angle and the second turning angle to determine a target turning angle for controlling the front wheel. Here, the reference information comprises a preview time. The first turning angle is used for eliminating a distance error between the vehicle and the preview tracking point, and the second turning angle is used for eliminating a heading error between the vehicle and the preview tracking point.

The minimum distance among a plurality of distances between the vehicle and the plurality of path points is a first distance. In a case where the first distance is within a preset distance range, at least one parameter of the preview time or a weight corresponding to the first turning angle is positively correlated with the first distance.

It should be understood that the device 600 for controlling a vehicle may further comprise other various modules to perform the method for controlling a vehicle of FIG. 1 and related embodiments.

Figure 7:
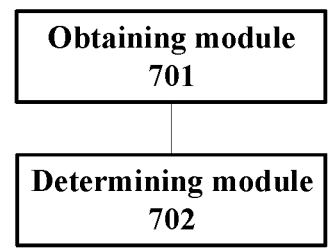
FIG. 7 is a schematic structural diagram of a device for controlling a vehicle according to other embodiments of the present disclosure.

FIG. 7 is a schematic structural diagram of a device for controlling a vehicle according to other embodiments of the present disclosure.

As shown in FIG. 7, the device 700 for controlling a vehicle comprises an obtaining module 701 and a determining module 702.

The obtaining module 701 is configured to obtain current state information of the vehicle. The state information comprises a position information and an attitude information.

The determining module 702 is configured to determine a preview tracking point from a plurality of path points of a target path to be tracked by the vehicle based on a reference information; and determine a target turning angle for controlling a front wheel based on the position information, the attitude information and the preview tracking point. Here, the reference information comprises a preview time, and the minimum distance among a plurality of distances between the vehicle and the plurality of path points is a first distance.

In a case where the first distance is within a preset distance range, the preview time is positively correlated with the first distance.

It should be understood that the device 700 for controlling a vehicle may further comprise other various modules to perform the method for controlling a vehicle of FIG. 3 and related embodiments.

Figure 8:
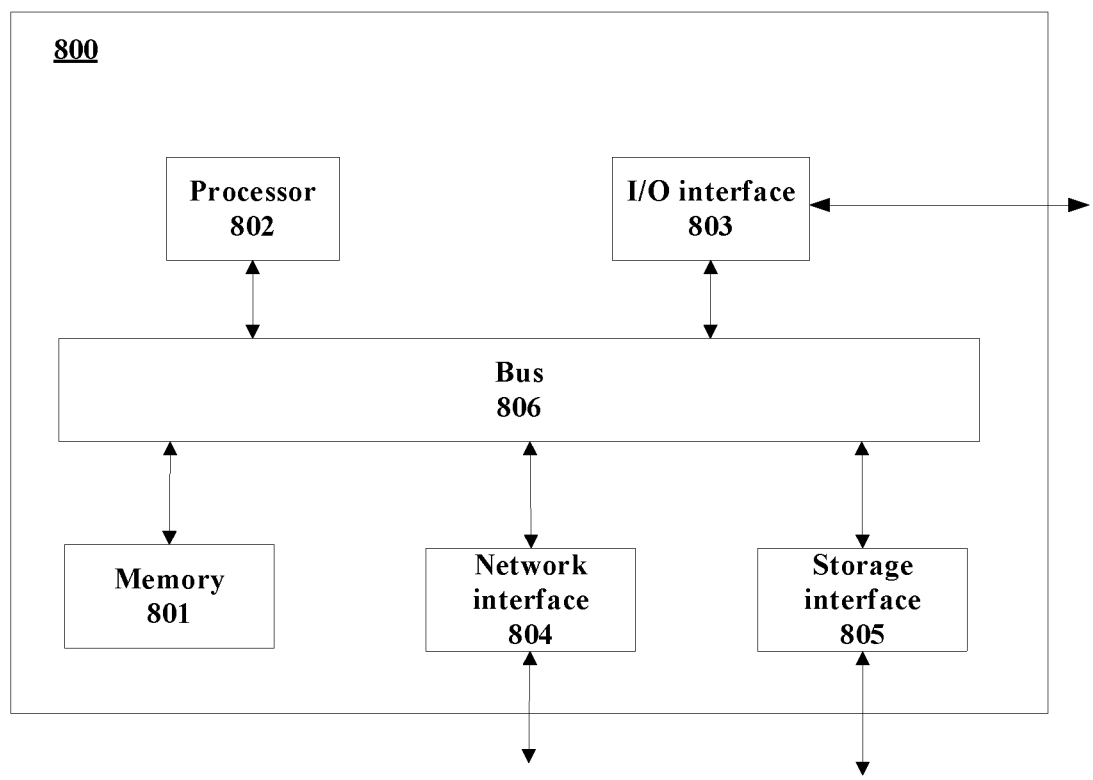
FIG. 8 is a schematic structural diagram of a device for controlling a vehicle according to further embodiments of the present disclosure.

FIG. 8 is a schematic structural diagram of a device for controlling a vehicle according to further embodiments of the present disclosure.

As shown in FIG. 8, the device 800 for controlling a vehicle comprises: a memory 801; and a processor 802 coupled to the memory 801, wherein the processor 802 is configured to perform the method according to any one of the above-described embodiments based on instructions stored in the memory 801.

The memory 801 may comprise, for example, a system memory, a fixed non-volatile storage medium, and the like. The system memory may store, for example, an operation system, an application program, a boot loader, and other programs.

The device 800 for controlling a vehicle may further comprise an I/O interface 803, a network interface 804, a storage interface 805, and the like. These interfaces 803, 804, and 805 may be connected, for example, via a bus 806 via which the memory 801 and the processor 802 may be connected. The I/O interface 803 provides a connection interface for an input/output device such as a display, a mouse, a keyboard, a touch screen and the like. The network interface 804 provides a connection interface for various networking devices. The storage interface 805 provides a connection interface for an external storage device such as a SD card, a USB flash disk and the like.

The embodiments of the present disclosure further provide a vehicle, comprising the device for controlling the vehicle (for example, the device 600, 700 or 800 for controlling the vehicle) according to any one of the above-described embodiments. In some embodiments, the vehicle is an off-road vehicle, for example, an agricultural vehicle.

The embodiments of the present disclosure further provide a computer-readable storage medium comprising computer program instructions, wherein the method according to any one of the above-described embodiments is implemented when the computer program instructions are executed by a processor.

The embodiments of the present disclosure also provide a computer program product comprising a computer program, wherein the method according to any one of the above-described embodiments is implemented when the computer program is executed by a processor.

Hereto, various embodiments of the present disclosure have been described in detail. Some details well known in the art are not described to avoid obscuring the concept of the present disclosure. According to the above description, those skilled in the art would fully understand how to implement the technical solutions disclosed here.

Various embodiments in this specification are described in a progressive manner, and each embodiment focuses on description of difference from other embodiments. For the same or similar parts between various embodiments, reference may be made to each other. As for the embodiments of the device and the vehicle, since they substantially correspond to the embodiments of the method, the descriptions are relatively simple. For the relevant parts, reference may be made to the description of the embodiments of the method.

Those skilled in the art should understand that the embodiments of the present disclosure may be provided as a method, a system, or a computer program product. Accordingly, the present disclosure may take the form of an entirely hardware embodiment, an entirely software embodiment, or a combination of software and hardware aspects. Moreover, the present disclosure may take the form of a computer program product implemented on one or more computer-usable non-transitory storage media (comprising but not limited to a disk memory, a CD-ROM, an optical memory, and the like) with computer usable program codes thereon.

The present disclosure is described with reference to the flowcharts and/or block diagrams of methods, devices (systems), and computer program products according to the embodiments of the present disclosure. It should be understood that a function specified in one or more processes in the flowcharts and/or one or more blocks in the block diagrams may be implemented by computer program instructions. These computer program instructions may be provided to a processor of a general purpose computer, a special purpose computer, an embedded processing machine, or other programmable data processing devices to produce a machine, such that a device for implementing a function specified in one or more processes of flowcharts and/or one or more blocks in block diagrams is produced by the instructions executed by a processor of a computer or other programmable data processing devices.

These computer program instructions may also be stored in a computer readable memory that can guide a computer or other programmable data processing devices to operate in a particular manner, such that the instructions stored in the computer readable memory produce an article of manufacture comprising an instruction device. The instruction device implements a function specified in one or more processes in flow charts or one or more blocks in block diagrams.

These computer program instructions may also be loaded onto a computer or other programmable data processing devices to perform a series of operational steps on the computer or other programmable devices to produce a computer-implemented process, such that the instructions executed on the computer or other programmable devices provide steps for implementing a function specified in one or more processes of the flowcharts and/or one or more blocks in the block diagrams.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments and equivalently substitution of a part of the technical features can be made without departing from the scope and spirit of the present disclosure. The scope of the present disclosure is defined by the appended claims.

What is claimed is:

1. A method for controlling a vehicle, comprising:
   obtaining current state information of the vehicle, wherein the state information comprises a position information and an attitude information;
   determining a preview tracking point from a plurality of path points of a target path to be tracked by the vehicle based on a reference information, wherein the reference information comprises a preview time;
   determining a first turning angle and a second turning angle of a front wheel of the vehicle based on the position information and the attitude information, wherein the first turning angle is used for eliminating a distance error between the vehicle and the preview tracking point, and the second turning angle is used for eliminating a heading error between the vehicle and the preview tracking point;
   performing a weighting calculation on the first turning angle and the second turning angle to determine a target turning angle for controlling the front wheel; and
   controlling the front wheel of the vehicle to rotate at the target turning angle,
   wherein a minimum distance among a plurality of distances between the vehicle and the plurality of path points is a first distance, and the preview time and a weight corresponding to the first turning angle are both positively correlated with the first distance in a case where the first distance is within a preset distance range.

2. The method according to claim 1, wherein a weight corresponding to the second turning angle is negatively correlated with the weight corresponding to the first turning angle.

3. The method according to claim 2, wherein a sum of the weight corresponding to the second turning angle and the weight corresponding to the first turning angle is equal to 1.

4. The method according to claim 1, wherein:
each of the at least one parameter changes within a preset parameter range in the case where the first distance is within the preset distance range;
each of the at least one parameter is equal to an upper limit of the preset parameter range in a case where the first distance is greater than or equal to an upper limit of the preset distance range; and
each of the at least one parameter is equal to a lower limit of the preset parameter range in a case where the first distance is smaller than or equal to a lower limit of the preset distance range.

5. The method according to claim 4, further comprising:
determining a proportional coefficient that changes within a preset coefficient range based on the first distance, wherein each of the at least one parameter is positively correlated with the proportional coefficient,
wherein the proportional coefficient is positively correlated with the first distance in the case where the first distance is within the preset distance range,
the proportional coefficient is equal to an upper limit of the preset coefficient range in the case where the first distance is greater than or equal to the upper limit of the preset distance range, and
the proportional coefficient is equal to a lower limit of the preset coefficient range in the case where the first distance is smaller than or equal to the lower limit of the preset distance range.

6. The method according to claim 5, wherein the lower limit of the preset coefficient range is 0, and the upper limit of the preset coefficient range is 1.

7. The method according to claim 5, wherein the proportional coefficient is equal to a ratio of the first distance to the upper limit of the preset distance range in the case where the first distance is within the preset distance range.

8. The method according to claim 1, wherein each of the at least one parameter is linearly correlated with the first distance in the case where the first distance is within the preset distance range.

9. A method for controlling a vehicle, comprising:
obtaining current state information of the vehicle, wherein the state information comprises a position information and an attitude information;
determining a trend line reflecting change of each candidate path of a plurality of candidate paths;
determining a second distance between the vehicle and the trend line based on the position information;
determining a comprised angle between a traveling direction of the vehicle and an extending direction of the trend line based on the attitude information; and
selecting one candidate path from the plurality of candidate paths as the target path based on the second distance and the comprised angle;
determining a preview tracking point from a plurality of path points of the target path based on a reference information, wherein the reference information comprises a preview time;
determining a target turning angle for controlling a front wheel of the vehicle based on the position information, the attitude information and the preview tracking point; and
controlling the front wheel of the vehicle to rotate at the target turning angle,
wherein a minimum distance among a plurality of distances between the vehicle and the plurality of path points is a first distance, and the preview time is positively correlated with the first distance in a case where the first distance is within a preset distance range.

10. The method according to claim 9, wherein selecting one candidate path from the plurality of candidate paths as the target path based on the second distance and the comprised angle comprises:
determining a first difference between each candidate path and the vehicle based on the second distance;
determining a second difference between each candidate path and the vehicle based on the comprised angle;
performing a weighting calculation on the first difference and the second difference to obtain a third difference between each candidate path and the vehicle; and
selecting the one candidate path from the plurality of candidate paths as the target path based on the third difference.

11. The method according to claim 10, wherein determining a first difference between each candidate path and the vehicle based on the second distance comprises:
normalizing the second distance to obtain the first difference.

12. The method according to claim 11, wherein the first difference is $d_2-w/w$, where $d_2$ is the second distance, and W is a reference distance.

13. The method according to claim 12, wherein the reference distance is equal to half of a distance between trend lines of two candidate paths in a case where the plurality of candidate paths comprises only the two candidate paths having the trend lines parallel to each other.

14. The method according to claim 12, wherein:
a path point closest to the vehicle in each candidate path is a first path point; and
the reference distance is a maximum value among a plurality of Euclidean distances between the vehicle and a plurality of first path points of the plurality of candidate paths in a case other than a preset case, wherein the plurality of candidate paths comprises only two candidate paths having trend lines parallel to each other in the preset case.

15. The method according to claim 1, wherein the reference information further comprises an arranging manner of the plurality of path points, and the arranging manner comprises a first arranging manner or a second arranging manner, wherein:
in the first arranging manner, lengths of straight line segments between adjacent path points among the plurality of path points are the same, and
in the second arranging manner, lengths of line segments along the target path between adjacent path points among the plurality of path points are the same.

16. The method according to claim 1, wherein:
a first line parallel to a tangent line tangent to the target path at the preview tracking point, a second line perpendicular to the tangent line, and an extending line of a traveling direction of the vehicle intersect at a first point, wherein a distance between the first point and the tangent line is a third distance;

the first turning angle is equal to arctan (the third distance/a preview distance); and the second turning angle is equal to a comprised angle between an extending direction of the tangent line and the traveling direction of the vehicle.

17. A device for controlling a vehicle, comprising:

a memory; and a processor coupled to the memory and configured to perform the method according to claim 1 based on instructions stored in the memory.

18. A vehicle, comprising:

the device for controlling the vehicle according to claim 17.

19. A non-transitory computer-readable storage medium, comprising computer program instructions, wherein the method according to claim 1 is implemented when the computer program instructions are executed by a processor.

* * * * *